J. MILLAR.
BELT FASTENER.
APPLICATION FILED JUNE 23, 1916.
1,250,611. Patented Dec. 18, 1917.
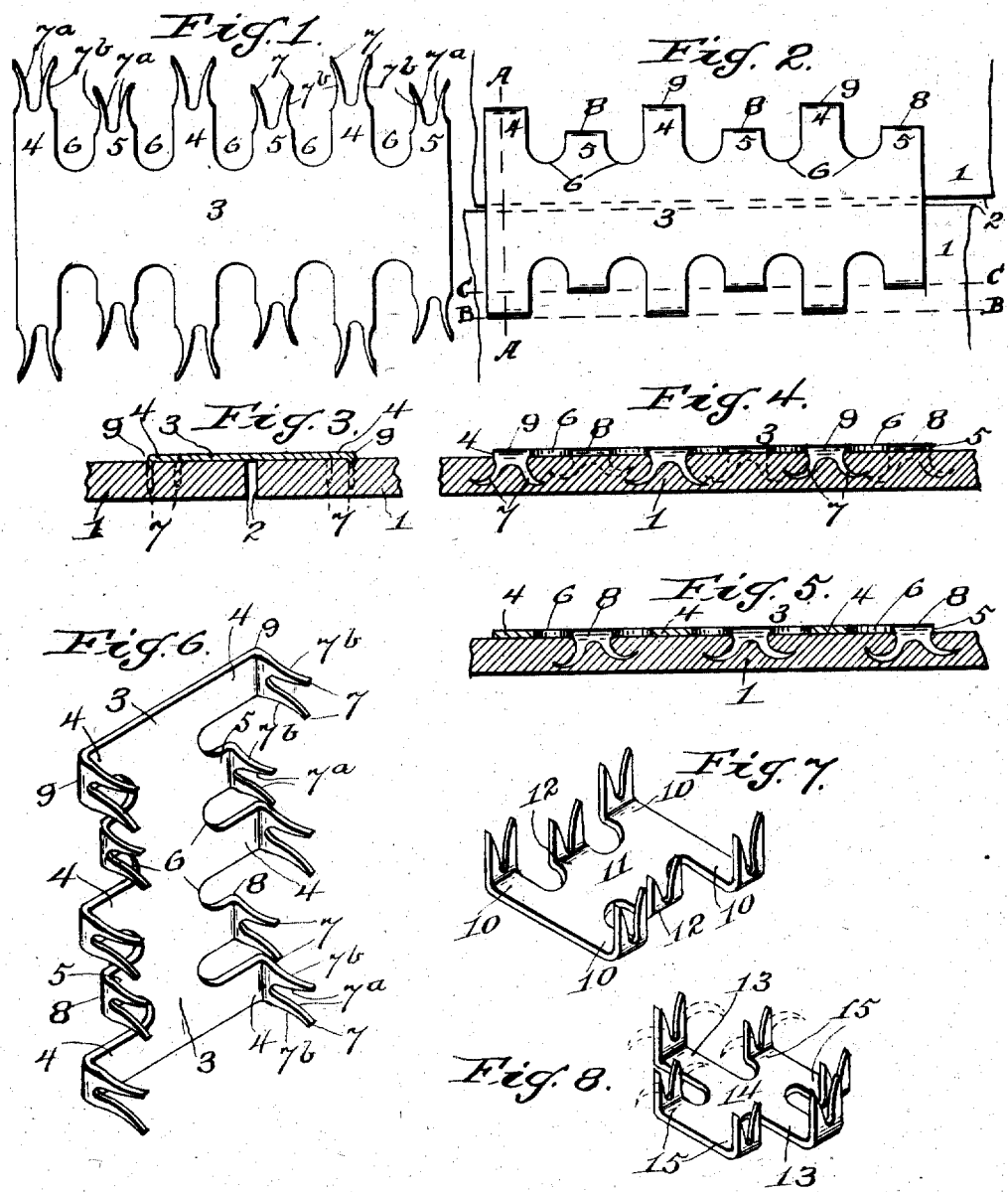
Witnesses
R. F. Lansdale
E. L. Wheeler
Inventor,
John Millar
By C. F. Belt
Attorney

UNITED STATES PATENT OFFICE.

JOHN MILLAR, OF NORWOOD, OHIO.

BELT-FASTENER.

1,250,611.     Specification of Letters Patent.     Patented Dec. 18, 1917.

Application filed June 23, 1916. Serial No. 105,441.

*To all whom it may concern:*

Be it known that I, JOHN MILLAR, a citizen of the United States, residing at Norwood, in the county of Hamilton and State of Ohio, have invented certain new and useful Improvements in Belt-Fasteners, of which the following is a specification.

This invention relates to belt fasteners and pertains especially to metallic fasteners for joining the meeting ends of driving belts.

The object of the invention is to provide a metallic fastener for the meeting ends of driving belts which shall not be exposed upon the inner side of the belt, or which shall afford the least possible exposure of the fastener upon the pulley side or inner surface of the belt, whereby frictional bearing of any part of the fasteners on the belt pulleys is lessened or entirely avoided.

A further object of the invention is to provide belt fasteners of such peculiar construction embodying means for clenching them to a belt as not to interfere with the pulley contact of the belt, and as to afford a flexible joining of the belt ends, to the exclusion of the usual wear and tear of the belt ends, and to the avoidance of the usual friction between the fasteners and driving pulleys.

Various other objects, advantages and improved results will be found in the practical application of the invention to be hereinafter fully described and claimed.

From practical experience, one of the greatest objections found in the usual metallic fasteners is that the contact of some part of such fasteners with the belt pulleys not only frictionally impedes the travel of the belt but injures and wears out the pulleys. Another serious objection and disadvantage in the ordinary fasteners is that they are anchored to the belt ends in such manner as to either pull out of place or tear away portions of the belt ends, thereby severing the belt connection, and leaving said ends incapable of renewed joining without considerably shortening the belt. These objections and disadvantages are entirely overcome by my improved fasteners now to be particularly described.

In the accompanying drawings forming part of this application:—

Figure 1 is a plan view of a fastener as stamped out.

Fig. 2 is a top view showing the meeting ends of a belt joined by my improved fastener.

Fig. 3 is a sectional view taken on the line A—A, Fig. 2.

Fig. 4 is a similar view taken on the dotted line B—B, Fig. 2.

Fig. 5 is a section taken on the dotted line C—C, Fig. 2.

Fig. 6 is an inverted perspective view.

Fig. 7 is a perspective view of a narrow fastener in condition for application to belt ends.

Fig. 8 is a similar view of a similar fastener, showing certain of the prongs as if clenched.

The same reference characters denote the same parts throughout the several views of the drawings.

For the purpose of illustration, an ordinary pulley belt is shown having meeting ends 2 joined by my improved metallic fastener, which comprises a plate 3 having alternating long and short arm-members 4 and 5 respectively, projecting opposite each other from opposite edges of the plate, with a space 6, preferably of the same width as the arm-members 4 and 5, between said members, and forming parallel scalloped plate edges, leaving the plate the same width through its length, and thereby reducing the weight of the fastener, in addition to providing uniform plate surfaces for the belt ends. The long arms 4 are of greater and the short arms 5, are of the same width, and the end of each of said arms is cut away so as to form the space 6, and diverging pointed prongs 7. The fastener is stamped, pressed or cut out in this shape preparatory to bending the arm-ends at right angles. The bend 8 in the short arms 5 is adjacent to the plate edge from which the arms project and to the inner end of the prongs 7 of the arms 5. The bend 9 in the long arms 4 is adjacent to the inner ends of the prongs of these arms, and preferably opposite the prongs of the short arms, so that the prongs of the respective arms may enter the belt at points of such distance from one another as to leave a considerable body of belt material intact or without puncture between the the short arms, and a like body of unpunctured belt material between the long arms. The piercing prongs are bent or spread laterally in driving the same into a belt, for fastening its ends together, and the prongs are of such length as to curl into clenching engagement with the belt in a direction parallel with the plate edges without piercing the inner or pulley face of the belt. The lateral bending of the prongs of the short arms is sufficient to have each pair clench the belt portions intervening between said arms and overlapped by the long arms. A like clenching on the part of the long arm prongs off-set from the short arm prongs lengthwise the belt, produces a lacing effect as clearly shown in Figs. 5 and 6, and affords a fastening means crosswise the belt so that all the prongs have a clenching position perpendicular to the pull of the belt ends with respect to the plate or fastener. The prongs 7 are convexed at $7^a$, and concaved at $7^b$, for facilitating lateral bending thereof.

The fastener shown in Fig. 7, is for narrow belts, and comprises two pair of side pronged arms 10, projecting from the plate 11, and each pair of arms having a pair of prongs 12 therebetween and projecting from the edges of the plate. Fig. 8 shows a similar fastener with a pair of long arms 13 projecting centrally from each edge of the plate 14, and two pair of short arms 15 at each side of the central arms. The prongs of both these forms, like the prongs first described, are bendable laterally in a clenching operation.

It will be seen that there is little or no part of the fasteners allowed to appear upon the inner face or pulley side of a belt, and that such face or side is therefore free of fastener contact with the pulleys. It will also be observed that the fastener plates afford a bearing surface for the belt ends as they pass over a pulley, so that there is no liability of the belt ends becoming pressed between the plate arms either in a clenching operation or in passing over a pulley. The curvature of the prongs expedites the curling thereof in a clenching operation.

By reason of the spaced arms of different length, and of the spaced curved prongs, there is an unusual amount of unpunctured belt material between each set of arms, as well as between the arms of each set, and also between each set of prongs and between the prongs of each set, whereby a greater body of solid belt material than usual is provided at the meeting ends of the belt.

I do not wish to be understood as confining my invention to any particular number of arms or prongs, number of plates, or to the length of the arms or prongs, nor do I wish to be understood as limiting my invention to a fastener plate having only pronged arms, or only projecting prongs, but reserve the right to make and use such variations and modifications of the fasteners herein described and shown, as may come within the scope of the appended claims.

Having thus described my invention what I claim as new and desire to secure by Letters Patent is:—

A one-piece fastening device for the outer face of the meeting ends of pulley belts, comprising a body plate, long arms projecting from opposite side edges of the plate opposite each other, a plurality of opposite short arms intervening the long arms with a space therebetween and terminating in a shoulder central of the length of the long arms, clenching prongs projecting from and at right angles to the outer end of the long arms, and clenching prongs projecting from the short arm shoulders, each of said prongs being convexed and concaved and adapted to be spread apart crosswise the arms for spanning said spaces in a belt-clenching operation.

In witness whereof I hereunto set my hand in the presence of two witnesses.

JOHN MILLAR.

Witnesses:
B. H. WALKER,
W. D. COPPINGER.

Copies of this patent may be obtained for five cents each, by addressing the "Commissioner of Patents, Washington, D. C."